(12) United States Patent
Motohashi

(10) Patent No.: US 10,046,624 B2
(45) Date of Patent: Aug. 14, 2018

(54) VEHICLE BACK DOOR

(71) Applicant: TOYOTA JIDOSHA KABUSHIKI KAISHA, Toyota-shi, Aichi-ken (JP)

(72) Inventor: Jumpei Motohashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/660,401

(22) Filed: Jul. 26, 2017

(65) Prior Publication Data

US 2018/0056763 A1 Mar. 1, 2018

(30) Foreign Application Priority Data

Aug. 29, 2016 (JP) .................................. 2016-166994

(51) Int. Cl.
*B62D 25/00* (2006.01)
*B60J 5/10* (2006.01)

(52) U.S. Cl.
CPC ..................................... *B60J 5/107* (2013.01)

(58) Field of Classification Search
CPC ........................................................ B60J 5/107
USPC ........................................................... 296/56
See application file for complete search history.

(56) References Cited

U.S. PATENT DOCUMENTS

| | | | | |
|---|---|---|---|---|
| 6,053,562 A * | 4/2000 | Bednarski | ................ | B60J 5/101 296/146.1 |
| 6,578,909 B1 * | 6/2003 | Reed | ...................... | B62D 25/04 296/203.01 |
| 8,182,025 B2 * | 5/2012 | Auchter-Bruening | ..... | B60J 7/04 296/191 |
| 8,690,220 B2 * | 4/2014 | Tsukiyama | ........... | B62D 35/007 296/106 |
| 8,894,128 B2 * | 11/2014 | Barral | ...................... | B60J 5/107 296/146.6 |
| 8,899,658 B1 * | 12/2014 | Gangal | .................... | B60J 5/107 296/146.6 |
| 8,915,532 B2 * | 12/2014 | Iwano | .................. | B62D 25/105 296/146.5 |
| 9,315,091 B1 * | 4/2016 | Werling | .................. | B60R 13/04 |
| 9,469,180 B2 * | 10/2016 | Kamimura | ............... | B60J 5/107 |
| 9,499,032 B2 * | 11/2016 | Ikeda | ....................... | B60J 5/101 |
| 9,688,125 B2 * | 6/2017 | Ayukawa | ................. | B60J 5/107 |
| 9,718,332 B2 * | 8/2017 | Mildner | ................... | B60J 5/102 |
| 9,931,914 B2 * | 4/2018 | Kawashima | ............. | B60J 5/107 |

(Continued)

FOREIGN PATENT DOCUMENTS

| | | |
|---|---|---|
| JP | 2010-247676 A | 11/2010 |
| JP | 2012-006486 A | 1/2012 |

*Primary Examiner* — Jerry E Redman
(74) *Attorney, Agent, or Firm* — Oliff PLC

(57) ABSTRACT

A vehicle back door including: an inner panel; an outer panel that has an attached member attached to a vehicle outer portion of the outer panel; a first adhesive that has at least a part arranged in a region overlapping the attached member as viewed from a vehicle rear side, and that joins the inner panel and the outer panel together; and a second adhesive that has a higher elasticity than the first adhesive, that has at least a part arranged in a region overlapping locations of the outer panel excluding a location where the attached member is attached as viewed from the vehicle rear side, that forms a frame shape together with the first adhesive, and that joins the inner panel and the outer panel together.

7 Claims, 11 Drawing Sheets

(56) References Cited

U.S. PATENT DOCUMENTS

| | | | | |
|---|---|---|---|---|
| 2007/0046060 A1* | 3/2007 | Werner | ................ | B60J 1/1884 296/51 |
| 2012/0280533 A1* | 11/2012 | Gachter | ................ | B60J 5/101 296/146.8 |
| 2012/0306231 A1* | 12/2012 | Ginestet | ................ | B60J 5/101 296/76 |
| 2013/0280452 A1* | 10/2013 | Nawroth | ................ | B60J 5/107 428/35.7 |
| 2015/0210147 A1* | 7/2015 | Kodama | ................ | B60J 5/10 296/146.6 |
| 2015/0329066 A1* | 11/2015 | Barrow | ................ | B60J 5/107 296/56 |
| 2016/0075216 A1* | 3/2016 | Kamimura | ............... | B60J 5/101 296/146.2 |
| 2016/0167492 A1* | 6/2016 | Ikeda | ................ | B60J 5/10 296/146.2 |

* cited by examiner

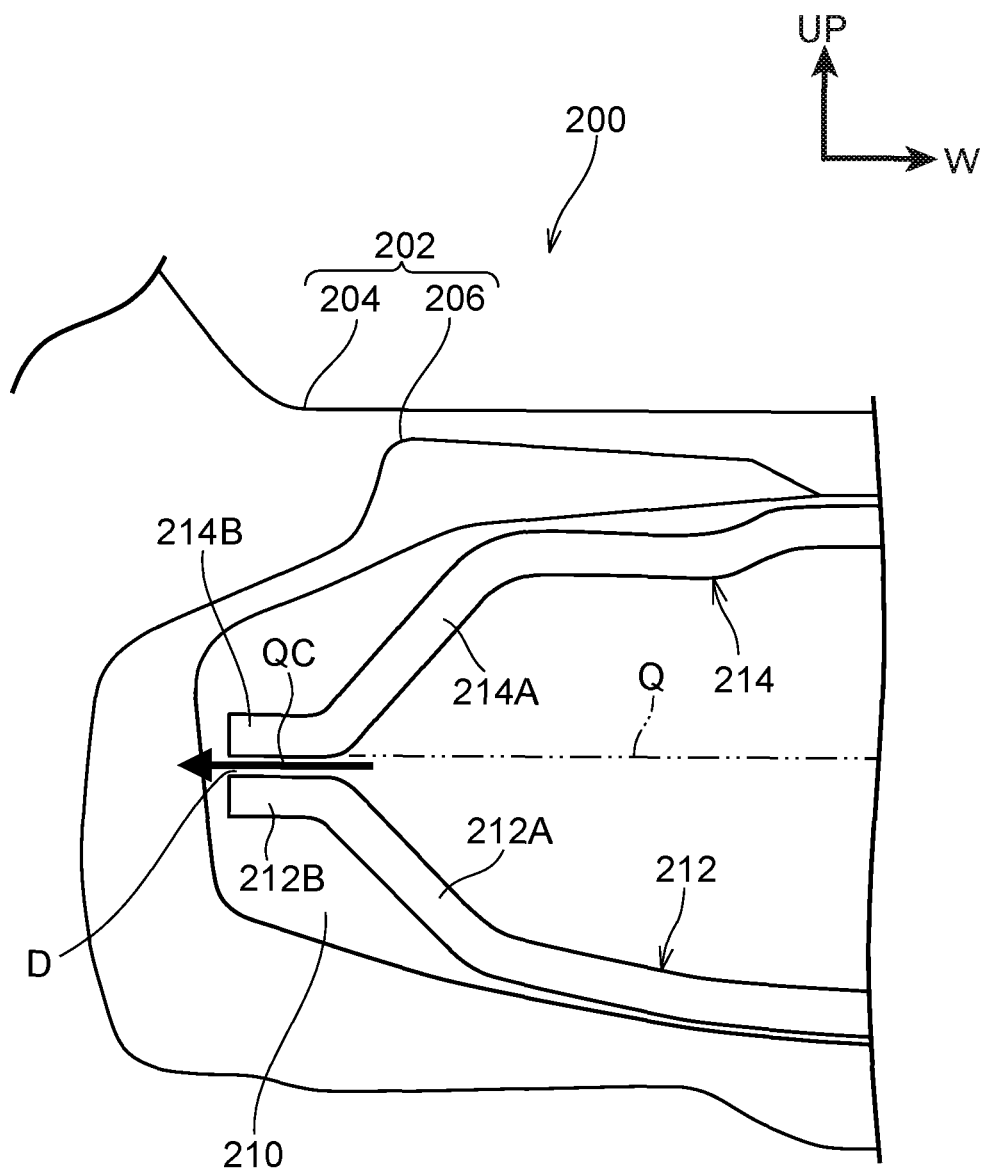

VEHICLE BACK DOOR

CROSS-REFERENCE TO RELATED APPLICATION

This application is based on and claims priority under 35 USC 119 from Japanese Patent Application No. 2016-166994 filed on Aug. 29, 2016, the disclosure of which is incorporated by reference herein.

BACKGROUND

Technical Field

The present disclosure relates to a vehicle back door.

Related Art

Japanese Patent Application Laid-Open (JP-A) No. 2010-247676 describes a vehicle back door in which an inner panel made of resin and an outer panel made of resin are overlapped with each other and joined together using a urethane-based adhesive.

In vehicle back doors in which an inner panel and a resin outer panel are adhered together using a first adhesive with high adhesive strength and low elasticity, although high adhesive strength is obtained, heat strain is liable to occur in the resin outer panel. One method to suppress this heat strain is a method in which a second adhesive with higher elasticity than the first adhesive is used. However, adhesives with high elasticity generally have low adhesive strength, and so there is a possibility that the adhesive strength between the inner panel and the resin outer panel might be lowered.

In consideration of this, a conceivable method would be to use the first adhesive in locations that are not a design face of the outer panel and that are also locations where adhesive strength is required, and to use the second adhesive with a higher elasticity than the first adhesive in locations that are a design face of the outer panel.

However, in cases in which adhesion is performed using the first adhesive and the second adhesive that have different elasticities from each other, it is difficult to manage tolerance of arranged positions of the first adhesive and the second adhesive, and it is difficult to apply the first adhesive and the second adhesive so as to be contiguous to each other. This leads to a gap occurring between the first adhesive and the second adhesive. Note that, in a state in which liquid such as rainwater has entered and collected between the inner panel and the outer panel, there is a possibility that this liquid might pass between the first adhesive and second adhesive and enter the vehicle interior when the vehicle back door is placed in an open state. Namely, in vehicle back doors in which the inner panel and the resin outer panel are adhered together using the first adhesive and the second adhesive with different elasticities from each other, there is room for improvement in suppressing liquid from entering the vehicle interior when the vehicle back door is placed in an open state.

SUMMARY

In consideration of the above circumstances, an object of the present disclosure is to obtain, in configurations in which an inner panel and a resin outer panel are adhered together by a first adhesive and a second adhesive with different elasticities from each other, a vehicle back door capable of suppressing liquid from entering a vehicle interior when the vehicle back door is placed in an open state.

A vehicle back door of a first aspect of the present disclosure includes: an inner panel that is capable of swinging about a hinge provided to an upper edge portion of the inner panel; an outer panel that is made of resin, that is disposed further toward a vehicle outer side than the inner panel and facing the inner panel in a vehicle front-rear direction, and that has an attached member attached to a vehicle outer portion of the outer panel; a first adhesive that has at least a part arranged in a region overlapping the attached member as viewed from a vehicle rear side, and that joins the inner panel and the outer panel together; and a second adhesive that has a higher elasticity than the first adhesive, that has at least a part arranged in a region overlapping locations of the outer panel excluding a location where the attached member is attached as viewed from the vehicle rear side, that forms a frame shape together with the first adhesive, and that joins the inner panel and the outer panel together. One from out of the first adhesive or the second adhesive includes a lower bottom portion that extends along a vehicle width direction, and lower extension portions that respectively extend from both vehicle width direction ends of the lower bottom portion toward a vehicle vertical direction upper side. The other from out of the first adhesive or the second adhesive includes an upper bottom portion that is arranged further toward the vehicle vertical direction upper side than the lower bottom portion and that extends along the vehicle width direction, and upper extension portions that respectively extend toward a vehicle vertical direction lower side from both vehicle width direction ends of the upper bottom portion and that are adjacent to the lower extension portions across a gap in the vehicle width direction. "Elasticity" refers to the property in which a body deforms when force is applied thereto and returns to its original state when the force is removed.

In a closed state of the vehicle back door of the first aspect of the present disclosure, there is a possibility that liquid such as rainwater might enter and collect within a space enclosed by the frame shape formed by the first adhesive and the second adhesive. In the state in which liquid has collected, when the vehicle back door is swung about a door hinge so as to be placed in an open state, the angle between the inner panel and the outer panel changes, and the liquid flows from the lower bottom portion toward the upper bottom portion. Moreover, some of the liquid flows along the vehicle width direction.

Note that the liquid that has flowed from the lower bottom portion to the upper bottom portion in the space enclosed by the first adhesive and the second adhesive contacts the upper bottom portion, such that the flow is restricted. Furthermore, the upper extension portions that extend toward the opposite side to the lower extension portions are adjacent to the lower extension portions across the gap in the vehicle width direction. Accordingly, liquid that has flowed along the vehicle width direction contacts at least one from out of the upper extension portions and the lower extension portions, such that the flow is restricted. In this manner, the flow of liquid from the space enclosed by the first adhesive and the second adhesive toward the outer side (vehicle inner side) is restricted, thereby enabling the liquid to be suppressed from entering the vehicle interior when the vehicle back door is placed in the open state.

The upper extension portions of a vehicle back door of a second aspect of the present disclosure are arranged further toward a vehicle width direction inner side than the lower extension portions.

In the vehicle back door of the second aspect of the present disclosure, the upper extension portions are arranged further toward the vehicle width direction inner side than the lower extension portions, and so when the vehicle back door is placed in the open state, liquid that has flowed along the lower extension portions contacts the upper extension portions. The liquid that has contacted the upper extension portions is the guided by the upper extension portions and flows toward the upper bottom portion. This enables the liquid to be suppressed from entering the gap between the upper extension portions and the lower extension portions.

In a vehicle back door of a third aspect of the present disclosure: the inner panel is formed with a first step portion that has a vehicle vertical direction upper side positioned further toward the vehicle rear side than a vehicle vertical direction lower side in a closed state of a door opening provided to a vehicle rear end; the outer panel is formed with a second step portion that has a vehicle vertical direction upper side positioned further toward the vehicle rear side than a vehicle vertical direction lower side in the closed state, and that is disposed facing the first step portion; and the lower extension portions and the upper extension portions are arranged in a region where the first step portion and the second step portion face each other.

In the vehicle back door of the third aspect of the present disclosure, when the vehicle back door is placed in the open state, the first step portion and the second step portion become vertical walls running along the vehicle vertical direction. Note that the lower extension portions and the upper extension portions are arranged on these vertical walls. When some of the liquid attempts to enter the gap between the lower extension portions and the upper extension portions, gravity acts on this liquid. Thus, the liquid is unable to run up the vertical walls. This enables the liquid to be suppressed from flowing into the gap between the lower extension portions and the upper extension portions.

The lower extension portions and the upper extension portions of a vehicle back door of a fourth aspect of the present disclosure each extend in a diagonal direction intersecting the vehicle vertical direction in a closed state of a door opening provided to a vehicle rear end.

In the vehicle back door of the fourth aspect of the present disclosure, when the vehicle back door is placed in the open state, some liquid attempts to enter the gap between the lower extension portions and the upper extension portions. Note that in the open state, the lower extension portions and the upper extension portions are arranged in diagonal directions intersecting the vehicle front-rear direction. Thus, it is only a component force of the force acting in the entry direction that acts on the liquid attempting to enter the gap. Namely, the force acting on the liquid in the gap is reduced, thereby enabling the liquid to be suppressed from flowing into the gap between the lower extension portions and the upper extension portions.

The first aspect of the present disclosure enables, in configurations in which the inner panel and the resin outer panel are adhered together by the first adhesive and the second adhesive with different elasticities from each other, liquid to be suppressed from entering the vehicle interior when the vehicle back door is placed in the open state.

The second aspect of the present disclosure enables liquid to be suppressed from entering the gap between the upper extension portions and the lower extension portions.

The third aspect and the fourth aspect of the present disclosure enable liquid to be suppressed from flowing into the gap between the upper extension portions and the lower extension portions.

BRIEF DESCRIPTION OF THE DRAWINGS

Exemplary embodiments of the present disclosure will be described in detail based on the following figures, wherein:

FIG. 11 is an explanatory diagram illustrating an arranged state of a first adhesive and a second adhesive of a back door according to a comparative example.

DETAILED DESCRIPTION

Explanation follows regarding a back door 14, serving as an example of a vehicle back door of an exemplary embodiment, based on FIG. 1 to FIG. 9. Note that in each of the drawings, the arrow FR indicates the vehicle front, the arrow RR indicates the vehicle rear, the arrow UP indicates the vehicle upper side, and the arrow W indicates the vehicle width direction, as appropriate. The arrow OUT indicates the vehicle width direction outer side, and the arrow R indicates the vehicle width direction right side. Unless specifically stated otherwise, simple reference to the front and rear, left and right, and up and down directions refers to front and rear in the vehicle front-rear direction, left and right in the vehicle left-right direction (vehicle width direction), and up and down in the vehicle vertical direction.

Figure 1:
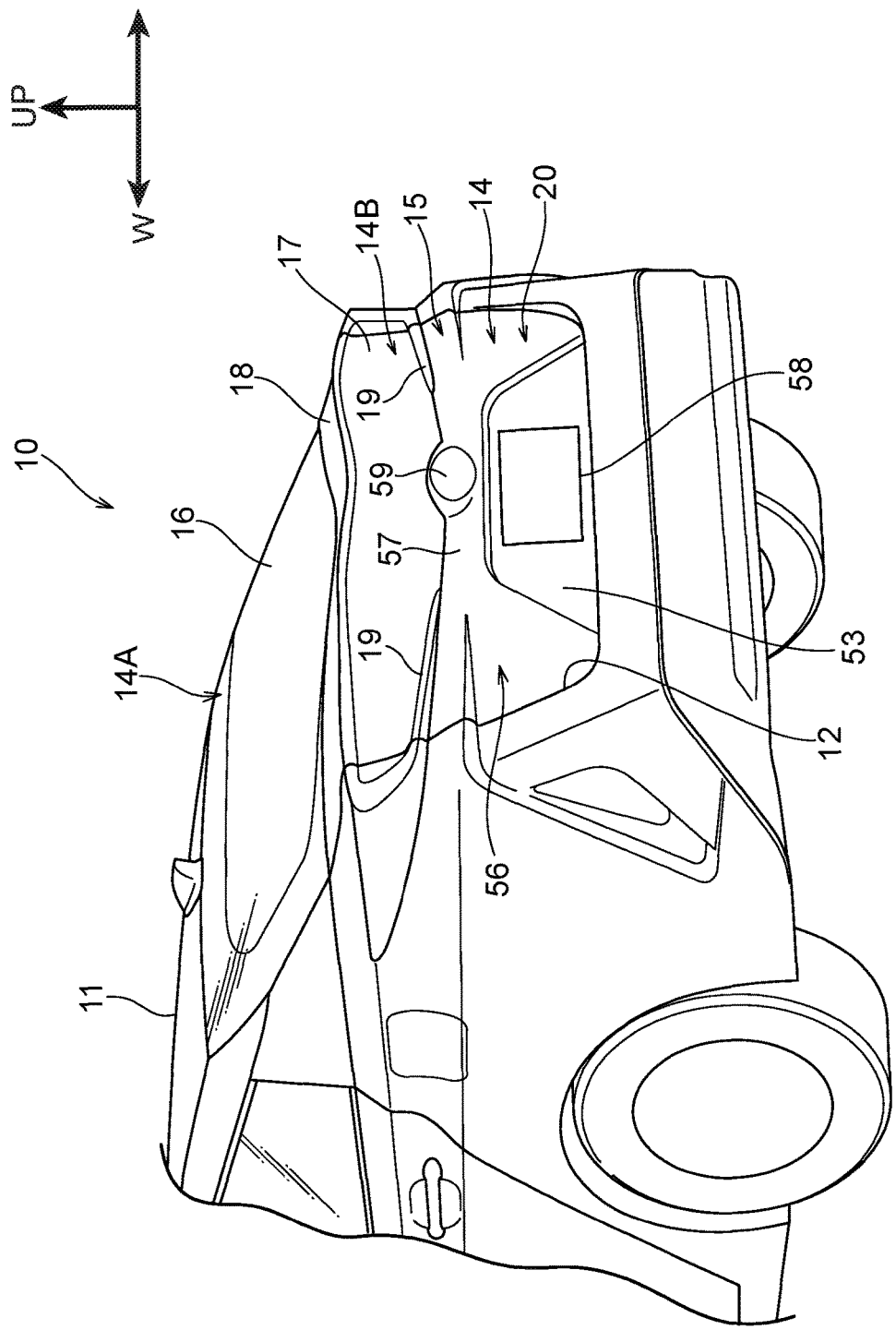
FIG. 1 is a perspective view of a vehicle applied with a back door according to an exemplary embodiment, as viewed diagonally from the vehicle rear side.

FIG. 1 illustrates a vehicle 10 configured including a vehicle body 11 and the back door 14. A door opening 12 that is open in the vehicle front-rear direction is formed in a rear end of the vehicle body 11. A door hinge 13 (see FIG. 2), serving as an example of a hinge with its axial direction along the vehicle width direction and that supports the back door 14 so as to allow swinging, is provided to an upper edge portion of the door opening 12 of the vehicle body 11 and an upper edge portion 25 (see FIG. 2) of an inner panel 22, described later.

Back Door

The back door 14 swings about the door hinge 13 (see FIG. 2) so as to be capable of opening or closing off the door opening 12. Note that the position of the back door 14 in a state in which the back door 14 has closed off the door opening 12 is referred to as a closed position. The position of the back door 14 in a state in which the back door 14 has opened the door opening 12 combined with a state in which swinging of the door hinge 13 has stopped is referred to as an open position.

Figure 2:
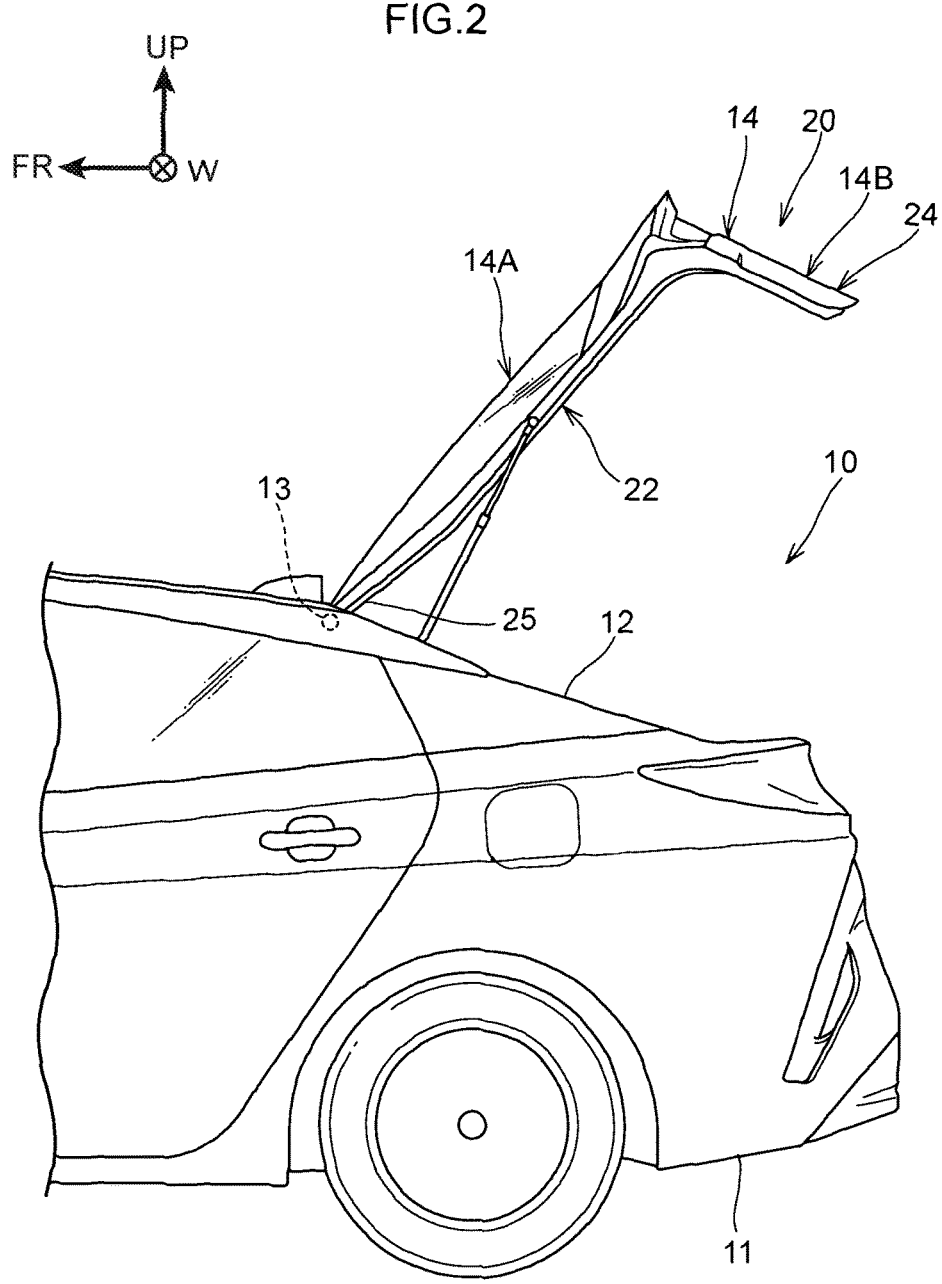
FIG. 2 is a side-on view illustrating a state in which a back door according to the present exemplary embodiment has been disposed in an open position.

As illustrated in FIG. 2, the back door 14 is formed in a substantially L shape as viewed from the side of the vehicle, and closes off the vehicle upper side and vehicle rear of the door opening 12 in a state disposed in the closed position. The back door 14 is configured by a door upper portion 14A that gradually extends diagonally from a vehicle vertical direction upper end portion toward the vehicle lower rear side, and a door lower portion 14B that hangs down from a vehicle front-rear direction rear end portion of the door upper portion 14A toward the vehicle lower side. Note that placement of each portion configuring the back door 14 is explained in the state in which the back door 14 is disposed in the closed position.

As illustrated in FIG. 1, the back door 14 is configured including a back door main body 15, back door glass 16 employed in a window, lower window glass 17 employed in a small window, and a rear spoiler 18. The back door glass 16 is disposed in the door upper portion 14A, and the lower glass 17 is disposed in an upper portion of the door lower portion 14B. A non-illustrated sealing member is arranged about an outer edge of the lower glass 17. The rear spoiler 18 is disposed between the back door glass 16 and the lower glass 17. The back door glass 16, the lower glass 17, and the rear spoiler 18 are attached to the back door main body 15.

Figure 3:
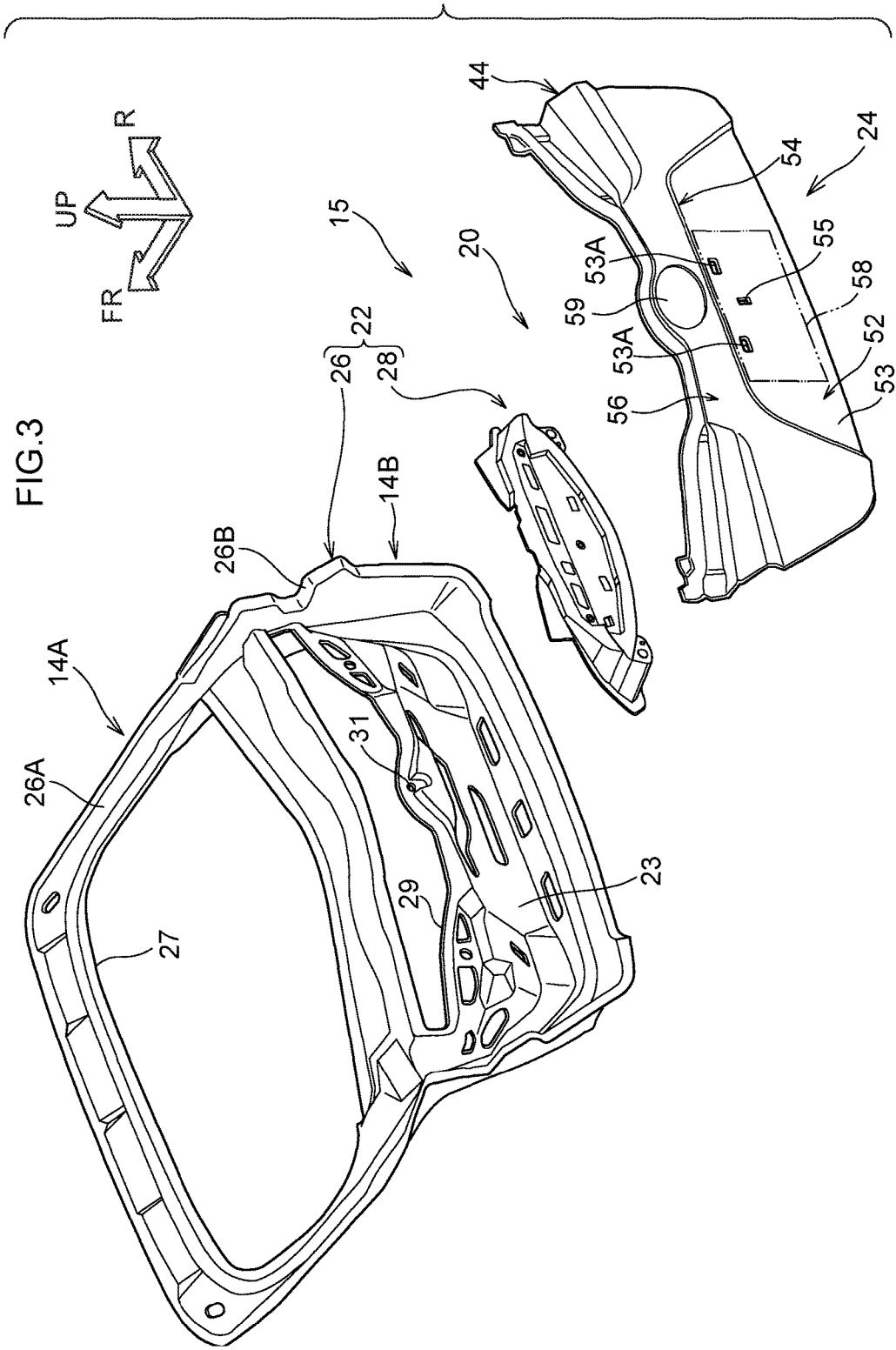
FIG. 3 is an exploded perspective view illustrating a door inner panel, an extension, and a door outer panel according to the present exemplary embodiment.
Figure 7:
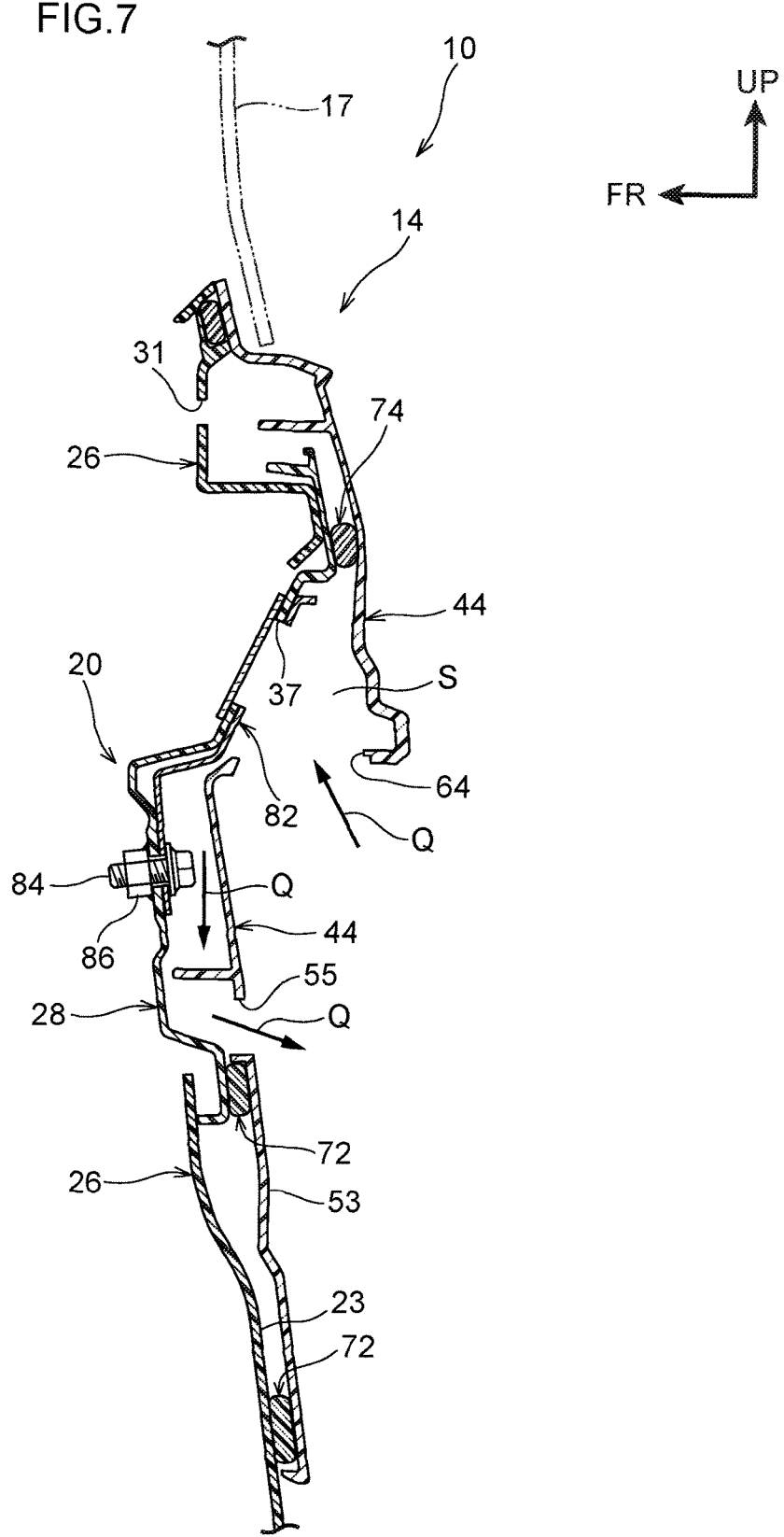
FIG. 7 is a vertical cross-section (a cross-section along line M-M in FIG. 4) of a closed state of a back door according to the present exemplary embodiment.

As illustrated in FIG. 3, the back door main body 15 is configured including the inner panel 22, an outer panel 24, and a bracket 82 (see FIG. 7). Note that the inner panel 22, the outer panel 24, together with a first adhesive 72 and a second adhesive 74 (see FIG. 4), described later, are collectively referred to as a back door structure 20.

Inner Panel

As illustrated in FIG. 2, the inner panel 22 is positioned on the vehicle inner side of a vehicle front-rear direction rear end section of the vehicle 10, and closes off the door opening 12 in the state in which the back door 14 is disposed in the previously-described closed position. As illustrated in FIG. 3, as an example, the inner panel 22 is configured including a door inner panel 26 and an extension 28.

Door Inner Panel

The door inner panel 26 is a panel member configuring a relevant portion of the back door main body 15, and as an example, is formed using carbon fiber reinforced plastic (CFRP) in which short carbon fibers are randomly oriented. The door inner panel 26 is formed in a substantially L shape as viewed from the side of the vehicle, and includes an upper portion 26A disposed at the door upper portion 14A, and a lower portion 26B disposed at the door lower portion 14B.

A window opening 27 is formed in the upper portion 26A. The back door glass 16 (see FIG. 1) is attached to the window opening 27. Outer upper panels 42 (see FIG. 4), described later, are attached to the upper portion 26A. A small window opening 29, which is thinner in the vehicle width direction than the window opening 27, is formed in a vehicle vertical direction upper portion of the lower portion 26B. The lower glass 17 (see FIG. 1) is attached to the small window opening 29. A rectangular-shaped vertical wall 23, which has its length in the vehicle width direction as viewed face-on from the vehicle rear side, is formed further toward the lower side and vehicle rear side than the small window opening 29 of the lower portion 26B. A through-hole 31 is formed piercing through in the vehicle front-rear direction at a vehicle width direction central portion of the door inner panel 26, between the small window opening 29 and the vertical wall 23.

Extension

As an example, the extension 28 is formed using CFRP, similarly to the door inner panel 26. The extension 28 is a member formed in a shape bulging toward the vehicle rear side. The extension 28 is overlapped and joined to the vertical wall 23 from the vehicle rear side and configures part of the door inner panel 26.

Figure 5:
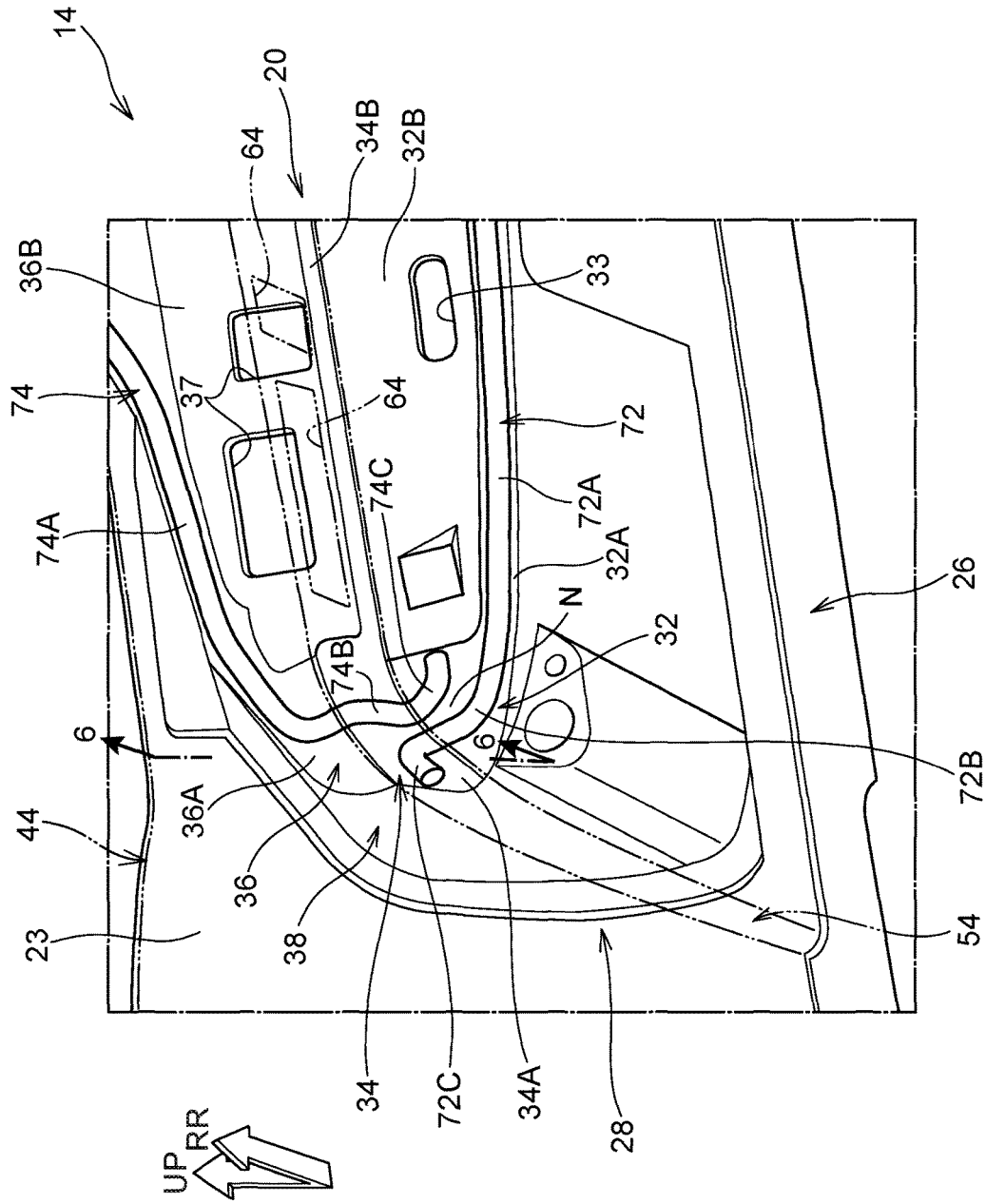
FIG. 5 is an exploded perspective view partially illustrating a joint location between an extension and a door outer panel according to the present exemplary embodiment.

As illustrated in FIG. 5, the extension 28 is configured including a lower portion 32 configuring a vehicle vertical direction lower portion thereof, a first step portion 34 formed at the upper side of the lower portion 32, an upper portion 36 formed at the upper side of the first step portion 34, and a peripheral wall portion 38. The peripheral wall portion 38 is a wall portion that extends from the lower portion 32, the first step portion 34, and the upper portion 36 toward the vehicle front-rear direction front side. A front end portion of the peripheral wall portion 38 is joined to the vertical wall 23.

The lower portion 32 includes an edge wall 32A formed in a U shape open toward the vehicle upper side as viewed face-on from the vehicle rear side, and a central wall 32B formed at the inner side of the edge wall 32A. The edge wall 32A is configured by a vertical wall running along the vehicle vertical direction and vehicle width direction. A vehicle rear (outer) side face of the edge wall 32A is formed in a planar shape. The central wall 32B is disposed further toward the vehicle front-rear direction front side than the edge wall 32A, and is configured by a vertical wall running along the vehicle vertical direction and vehicle width direction. Through-holes 33, which expose fastening portions for fastening non-illustrated bolts in order to attach a license plate 58 (see FIG. 1), described later, are formed in the central wall 32B.

In the closed state in which the back door 14 has closed off the door opening 12 (see FIG. 1), the first step portion 34 is a location where the vehicle vertical direction upper side is positioned further toward the vehicle rear side than the vehicle vertical direction lower side thereof. In other words, the first step portion 34 is a location formed with a crank-shaped cross-section as viewed from the vehicle width direction.

As an example, the first step portion 34 extends from a vehicle vertical direction upper end of the lower portion 32 toward the vehicle front-rear direction rear side. Specifically, the first step portion 34 includes end walls 34A that are disposed at both vehicle width direction end portions thereof and that are linked to the edge wall 32A, and a central wall 34B that is disposed further toward the inner side than the end walls 34A and that is linked to the central wall 32B. The end walls 34A are formed in two locations that have left-right symmetry with respect to the vehicle width direction center of the extension 28. As an example, the end walls 34A are each curved such that the vehicle width direction outer side is positioned further toward the lower side than the vehicle width direction inner side thereof. The central wall 34B has a shorter vehicle front-rear direction length than the end walls 34A.

The upper portion 36 extends toward the vehicle vertical direction upper side from a vehicle front-rear direction rear end of the first step portion 34. The upper portion 36 includes an edge wall 36A formed in a U shape open toward the vehicle lower side as viewed face-on from the vehicle rear side, and a sloped wall 36B formed at the vehicle width direction inner side of the edge wall 36A. The edge wall 36A is a vertical wall that runs along the vehicle vertical direction and vehicle width direction. A vehicle rear (outer) side face of the edge wall 36A is formed in a planar shape. Lower ends of the edge wall 36A are respectively linked to rear ends of the end walls 34A.

As an example, the sloped wall 36B is a wall that slopes such that a vehicle vertical direction upper end portion is positioned further toward the vehicle front-rear direction rear side than a vehicle vertical direction lower end portion thereof. The lower end portion of the sloped wall 36B is linked to a vehicle front-rear direction rear end portion of the central wall 34B. Plural through-holes 37, for disposing a non-illustrated license plate lamp to illuminate the license plate 58 (see FIG. 1), described later, a non-illustrated door handle to open the back door 14, and so on, are formed in the sloped wall 36B.

Outer Panel

As illustrated in FIG. 3, the outer panel 24 is disposed further toward the vehicle outer side (vehicle rear side) than the inner panel 22 and faces the inner panel 22 in the vehicle front-rear direction. The outer panel 24 is configured including the outer upper panels 42 (see FIG. 4) and an outer lower panel 44.

Outer Upper Panel

Figure 4:
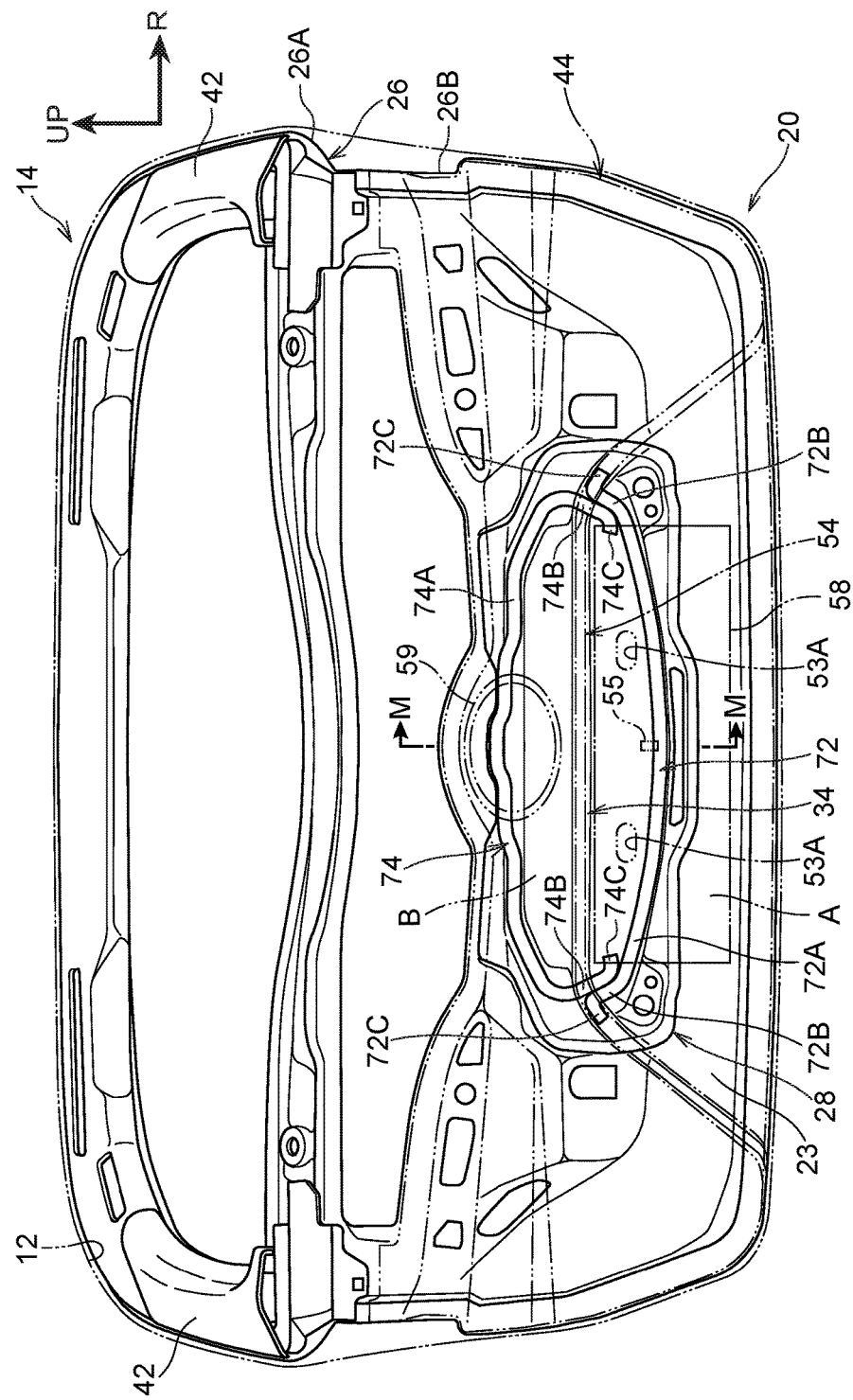
FIG. 4 is a back view illustrating a door inner panel, an extension, and a door outer panel according to the present exemplary embodiment.

As an example, the outer upper panels 42 as illustrated in FIG. 4 are formed using CFRP, and are joined to the vehicle diagonal upper rear side of the upper portion 26A of the door inner panel 26.

Outer Lower Panel

The outer lower panel 44 as illustrated in FIG. 3 is joined by the first adhesive 72 and the second adhesive 74 (see FIG. 4), described later, to the vehicle rear side of the extension 28 that is joined to the door inner panel 26. As an example, the outer lower panel 44 is formed using Toyota Super Olefin Polymer (TSOP (registered trademark), this being a thermoplastic resin including polypropylene (PP) and ethylene-propylene-diene rubber (EPDM)) that has a greater linear expansion coefficient than CFRP. The outer lower panel 44 forms part of an exterior design face of the vehicle 10 (see FIG. 1).

The outer lower panel 44 is configured including a plate attachment portion 52 configuring a vehicle vertical direction lower portion thereof, a second step portion 54 formed to an edge portion of the plate attachment portion 52, and an upper wall portion 56 formed at the upper side of the second step portion 54. The plate attachment portion 52 is an example of a vehicle outer side portion of the outer panel 24.

The plate attachment portion 52 includes a vertical wall 53 formed in a trapezoidal shape as viewed face-on from the vehicle rear side. The vertical wall 53 is disposed along the vehicle vertical direction and vehicle width direction. Through-holes 53A, which each expose the fastening portions for fastening the non-illustrated bolts, are formed in the vertical wall 53. The license plate 58, serving as an example of an attachment member and illustrated by an intermittent line (double-dotted dashed line), is capable of being attached to the vertical wall 53. The through-holes 53A are in communication with the previously-described through-holes 33 (see FIG. 5). The license plate 58 is rectangular shaped with its length along the vehicle width direction. A water drainage hole 55 is formed in the vertical wall 53 in order to drain liquid (such as water) that has entered between the door inner panel 26 and the outer lower panel 44 to the vehicle exterior.

Figure 6:
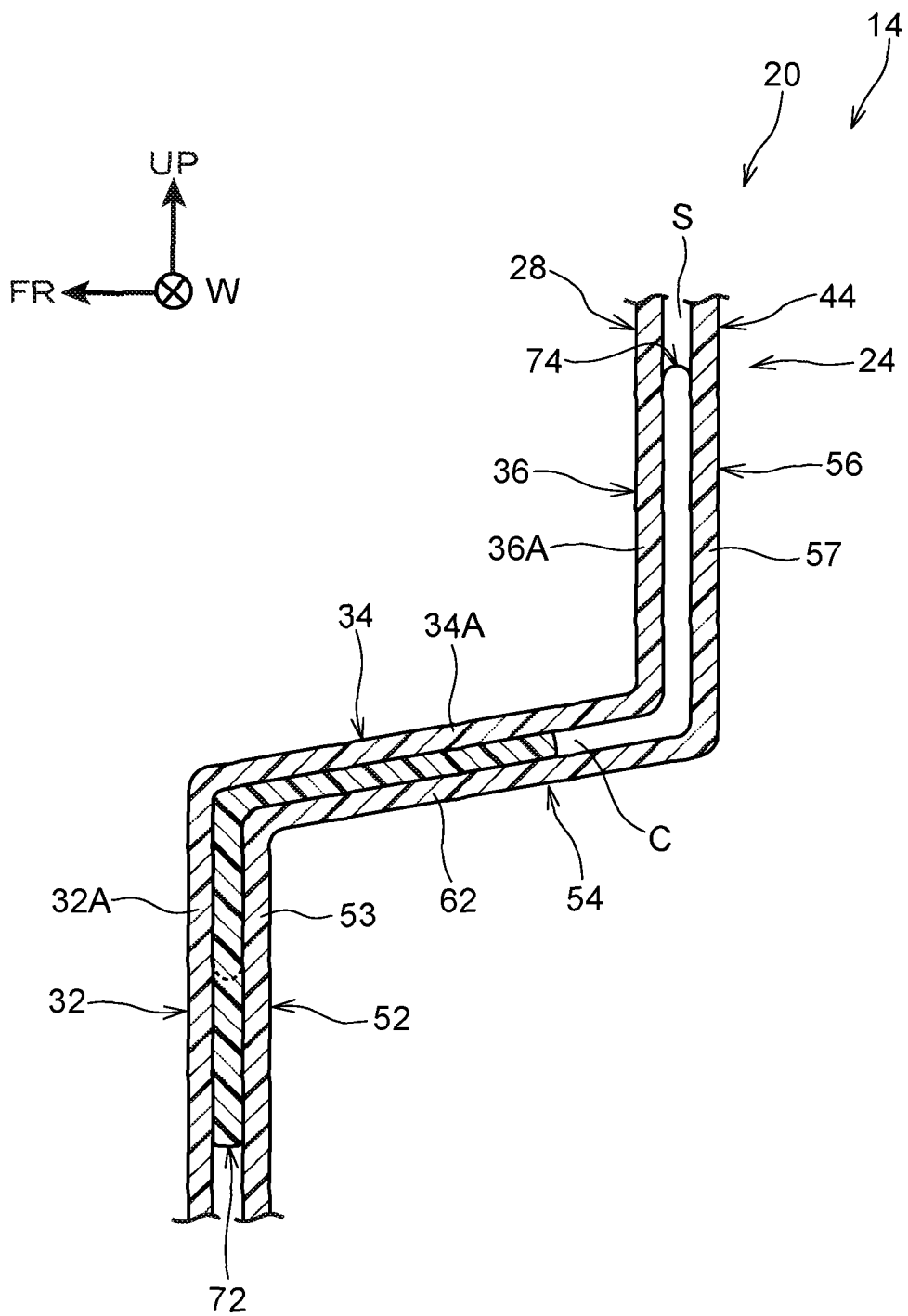
FIG. 6 is a vertical cross-section (a cross-section along line 6-6 in FIG. 5) schematically illustrating a joint location between an extension and a door outer panel according to the present exemplary embodiment.

FIG. 6 is a simplified cross-section illustrating the first step portion 34 of the extension 28 and the second step portion 54 of the outer lower panel 44. In the previously-described closed state, the second step portion 54 is positioned such that the vehicle vertical direction upper side is further toward the vehicle rear side than the vehicle vertical direction lower side thereof, and is a location disposed facing the first step portion 34 in the vehicle vertical direction. In other words, the second step portion 54 is a location formed with a crank-shaped cross-section as viewed from the vehicle width direction.

As an example, the second step portion 54 includes a step wall 62 that extends from a vehicle vertical direction upper end portion and both left and right end portions of the plate attachment portion 52 toward the vehicle front-rear direction rear side. Plural through-holes 64 (see FIG. 5), in which the previously-described, non-illustrated license plate lamp, door handle, and so on are disposed, are formed in the step wall 62. Gaps are present between hole walls of the through-holes 64 and the license plate lamp, and between hole walls of the through-holes 64 and the door handle. There is accordingly a possibility that liquid (water) might pass from outside the outer lower panel 44 through the through-holes 64 and enter a space S between the outer lower panel 44 and the extension 28.

The upper wall portion 56 extends from a vehicle front-rear direction rear end of the second step portion 54 toward the vehicle vertical direction upper side. The upper wall portion 56 includes a vertical wall 57. The vertical wall 57 is disposed at the vehicle vertical direction upper side of the license plate 58 (see FIG. 1), and is disposed along the vehicle vertical direction and vehicle width direction. As an example, an emblem 59 (see FIG. 1) is provided on the vertical wall 57. Tail lamps 19 (see FIG. 1) are provided further toward the vehicle width direction outer sides than the vertical wall 57 of the upper wall portion 56.

The edge wall 32A and the vertical wall 53 are disposed facing each other in the vehicle front-rear direction in the previously-described closed state. The vertical wall 53 is disposed further toward the rear side than the edge wall 32A. The end walls 34A and the step wall 62 are disposed facing each other in the vehicle vertical direction. The step wall 62 is disposed further toward the lower side than the end walls 34A. The edge wall 36A and the vertical wall 57 are disposed facing each other in the vehicle front-rear direction. The vertical wall 57 is disposed further toward the rear side than the edge wall 36A.

Bracket

As illustrated in FIG. 7, the bracket 82 is provided between the extension 28 and the outer lower panel 44. The bracket 82 is a member that supports the non-illustrated license plate lamp and door handle. The bracket 82 is fastened to the extension 28 by bolts 84 and nuts 86. Note that the bracket 82 closes off the through-holes 37 of the extension 28, but does not close off the through-holes 64 of the outer lower panel 44. Thus, as previously described, there is a possibility that liquid (water) might enter the space S through the through-holes 64.

First Adhesive Member

As an example, the first adhesive 72 is configured by a urethane-based adhesive that hardens at approximately 80° C. The first adhesive 72 joins the extension 28 and the outer lower panel 44 together in the previously-described space S.

As illustrated in FIG. 4, the first adhesive 72 is arranged (coated) on the edge wall 32A and the end walls 34A of the extension 28 in a U-shaped cord shape open toward the vehicle vertical direction upper side. Specifically, the first adhesive 72 includes an elongated portion 72A serving as an example of a lower bottom portion extending along the vehicle width direction, and extension portions 72B serving as examples of lower extension portions respectively extending from both vehicle width direction ends of the elongated portion 72A toward the vehicle vertical direction upper side. The elongated portion 72A is curved in a shape bulging toward the vehicle vertical direction lower side.

An upper portion of each extension portion 72B is arranged on a region C (see FIG. 6). Namely, each extension portion 72B is bent. Note that a central portion and a lower portion of each extension portion 72B extend in a diagonal direction intersecting the vehicle vertical direction in the previously-described closed state. Specifically, the central portion and the lower portion of each extension portion 72B are arranged sloping such that a vehicle vertical direction lower end is positioned further toward the vehicle width direction inner side than a vehicle vertical direction upper end thereof. The upper portion of the extension portion 72B also extends in a diagonal direction intersecting the vehicle front-rear direction in the previously-described closed state. Specifically, the upper portion of each extension portion 72B is arranged sloping such that a vehicle front-rear direction front end is positioned further toward the vehicle width direction inner side than a vehicle front-rear direction rear end thereof. As an example, a bent portion 72C that bends toward the vehicle width direction outer side is formed to an end portion on the opposite side of each extension portion 72B to the elongated portion 72A.

Note that, when the license plate 58 is projected in the vehicle front-rear direction and viewed in the vehicle front-rear direction from the vehicle rear side, a region that overlaps with the license plate 58 is referred to as a region A. The elongated portion 72A is arranged in the region A. In other words, the region A is a region further inside than an outline of the license plate 58 illustrated by an intermittent, double-dotted dashed line in FIG. 4. In FIG. 4, the region overlapping locations of the outer lower panel 44 excluding the location where the license plate 58 is attached is referred to as a region B. The region B is a region outside the region A. As an example, the extension portions 72B and the bent portions 72C are arranged in the region B.

As illustrated in FIG. 5, the elongated portion 72A and the central portions and lower portions of the extension portions 72B are arranged on the edge wall 32A. The upper portions of the extension portions 72B and the bent portions 72C are respectively arranged on the end walls 34A. In other words, the extension portions 72B are arranged in the region C (see FIG. 6) facing the previously-described first step portion 34 and second step portion 54 (see FIG. 6).

Second Adhesive

The second adhesive 74 as illustrated in FIG. 4 is an adhesive with a higher elasticity than the first adhesive 72, and is configured by a butyl rubber-based adhesive (butyl tape) as an example. The second adhesive 74 joins the extension 28 and the outer lower panel 44 together in the previously-described space S (see FIG. 6). Together with the first adhesive 72, the second adhesive 74 forms a substantially rectangular frame shape as viewed in the vehicle front-rear direction from the vehicle rear side.

Specifically, the second adhesive 74 is arranged in a U-shaped cord shape open toward the vehicle vertical direction lower side on the edge wall 32A, the end walls 34A, and the edge wall 36A (see FIG. 5) of the extension 28. The second adhesive 74 includes an elongated portion 74A serving as an example of an upper bottom portion extending along the vehicle width direction, and extension portions 74B serving as examples of lower extension portions respectively extending from both vehicle width direction ends of the elongated portion 74A toward the vehicle vertical direction lower side.

The elongated portion 74A curves in a shape bulging toward the vehicle vertical direction upper side. The elongated portion 74A is arranged further toward the vehicle vertical direction upper side than the elongated portion 72A.

A central portion of each extension portion 74B is arranged in the region C (see FIG. 6). Namely, each extension portion 74B is bent into a crank shape as viewed from the vehicle width direction. Note that the central portion of each extension portion 74B extends in a diagonal direction intersecting the vehicle front-rear direction in the previously-described closed state. Specifically, the central portion of each extension portion 74B is arranged sloping such that a vehicle front-rear direction front end is positioned further toward the vehicle width direction inner side than a vehicle front-rear direction rear end thereof. A lower portion of each extension portion 74B extends in a diagonal direction intersecting the vehicle vertical direction in the previously-described closed state. Specifically, the lower portion of each extension portion 74B is arranged sloping such that a vehicle vertical direction lower end is positioned further toward the vehicle width direction inner side than a vehicle vertical direction upper end thereof. As an example, a bent portion 74C that bends toward the vehicle width direction inner side is formed to an end portion on the opposite side of each extension portion 74B to the elongated portion 74A.

The elongated portion 74A and the extension portions 74B are arranged in the region B as viewed in the vehicle front-rear direction from the vehicle rear side. As an example, the bent portions 74C are arranged in the region A.

As illustrated in FIG. 5, the elongated portion 74A and upper portions and central portions of the respective extension portions 74B are arranged on the edge wall 36A. The lower portions of the extension portions 74B are respectively arranged on the end walls 34A. In other words, the extension portions 74B are arranged in the previously-described region C (see FIG. 6). The extension portions 74B are adjacent to the respective extension portions 72B in the vehicle width direction with gaps N therebetween. The extension portions 74B are arranged further toward the vehicle width direction inner side than the extension portions 72B.

Comparative Example

Explanation follows regarding a back door 200 of a comparative example.

The back door 200 of the comparative example illustrated in FIG. 11 includes an inner panel 202 and a non-illustrated outer panel. The back door 200 is capable of swinging about a non-illustrated hinge provided to an upper edge portion thereof. The inner panel 202 includes a door inner panel 204 and an extension 206 joined to the door inner panel 204. The extension 206 includes a vertical wall 210 running along the vehicle width direction and vehicle vertical direction in a closed state in which the back door 200 has closed off a non-illustrated door opening.

An adhesive 212 is arranged on a vehicle vertical direction lower portion of the vertical wall 210. The adhesive 212 is configured by a similar material to the previously-described first adhesive 72 (see FIG. 4). An adhesive 214 is arranged on a vehicle vertical direction upper portion of the vertical wall 210. The adhesive 214 is configured by a similar material to the previously-described second adhesive 74 (see FIG. 4). The adhesive 212 and the adhesive 214 join the extension 206 and the non-illustrated outer panel together.

As viewed from the vehicle front-rear direction, the adhesive 212 includes a U-shaped bottom portion 212A open toward the vehicle vertical direction upper side and extension portions 212B extending out from both vehicle width direction end portions of the bottom portion 212A along the vehicle width direction toward the outer sides. As viewed from the vehicle front-rear direction, the adhesive 214 includes a U-shaped upper portion 214A open toward the vehicle vertical direction lower side, and extension portions 214B extending out from both vehicle width direction end portions of the upper portion 214A along the vehicle width direction toward the outer sides. The extension portions 212B and the respective extension portions 214B are adjacent to each other in the vehicle vertical direction with gaps D therebetween. In other words, the gaps D run along the vehicle width direction.

Supposing that water Q has entered and collected between the adhesive 212 and the adhesive 214 through gaps in the non-illustrated outer panel of the back door 200. When the back door 200 is swung from a closed position to an open position, most of the collected water Q flows toward the adhesive 214 side; however, the remaining water QC attempts to flow in the vehicle width direction along the adhesive 212. Note that the gaps D run along the vehicle width direction at both vehicle width direction end portions of the adhesive 212, such that the water QC flows outward through the gaps D. Namely, in the back door 200 of the comparative example, the extension portions 212B and the extension portions 214B are adjacent to each other in the vehicle vertical direction with the gaps D therebetween, and so it is difficult to suppress the water QC from entering the vehicle interior.

Operation and Advantageous Effects

Explanation follows regarding operation and advantageous effects of the back door 14 of the present exemplary embodiment.

Warping of Outer Lower Panel Due to Adhesive Hardening

In the back door 14 as illustrated in FIG. 4, the adhesive strength between the extension 28 and the outer lower panel 44 in the region A, where the outer lower panel 44 and the license plate 58 overlap each over as viewed from the vehicle front-rear direction, is secured by the first adhesive 72. Note that when the first adhesive 72 is heated and hardened, warping occurs in the location of the outer lower panel 44 where the first adhesive 72 is arranged; however, this location is covered from the vehicle rear side by the license plate 58, and so the design of the back door 14 is not affected.

The second adhesive 74 that has a higher elasticity than the first adhesive 72 is employed in the region B of the back door 14. Thus, the location of the outer lower panel 44 where the second adhesive 74 is arranged is less liable to warp when the second adhesive 74 hardens than the location where the first adhesive 72 is arranged. Note that although the adhesive strength of the second adhesive 74 is lower than that of the first adhesive 72, the adhesive strength required at the location where the second adhesive 74 is arranged is lower than that required at the location where the first adhesive 72 is arranged, and so this is not an issue.

Water Entry in Closed State of Back Door

As illustrated in FIG. 7, in a state in which the door opening 12 (see FIG. 4) has been closed off by the back door 14, as an example, in cases in which water Q such as rainwater has entered the space S through the through-holes 64, the water Q runs downward under the action of gravity and is drained though the water drainage hole 55. However, in cases in which there is a large amount of water Q in the closed state, there is a possibility that the water Q might collect in the space S.

Figure 8:
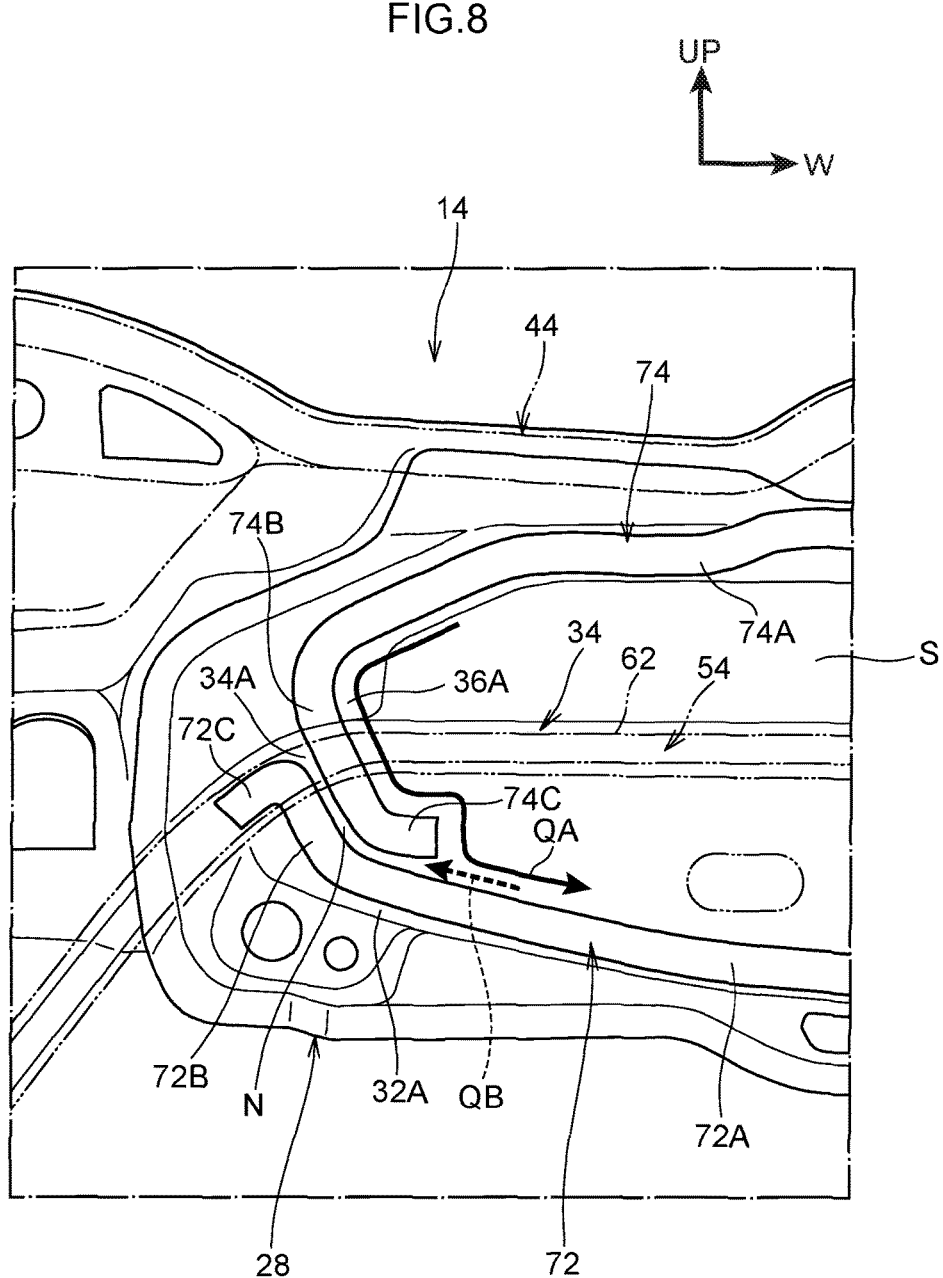
FIG. 8 is an explanatory diagram illustrating a flow of water that has collected between an extension and a door outer panel in a closed state of a back door according to the present exemplary embodiment.

As illustrated in FIG. 8, water flowing at the inner side of the elongated portion 74A toward the vehicle vertical direction lower side along the edge wall 36A (referred to as water QA) passes the extension portions 74B and flows along the elongated portion 72A. Note that the extension portions 74B are adjacent to the extension portions 72B in the vehicle width direction, and so even if the water QA wraps around at lower ends of the extension portions 74B, the flow of the water QA is restricted by the elongated portion 72A and the extension portions 72B. Note that, as an example, the first adhesive 72 and the second adhesive 74 are disposed with left-right symmetry with respect to the vehicle width direction center of the back door 14. Thus, only left-side portions of the first adhesive 72 and the second adhesive 74 are explained, and explanation regarding right-side portions thereof is omitted.

Although the gaps N are present between the extension portions 72B and the respective extension portions 74B, the gaps N are disposed at the edge wall 32A extending along the vehicle vertical direction. Gravity acts on the water QA. Thus, water QB illustrated by the arrow QB can be suppressed from entering the gaps N counter to gravity. Namely, the water QA can be suppressed from entering the vehicle interior of the vehicle 10 (see FIG. 1) through the gaps N.

Water Entry in Open State of Back Door

Figure 9:
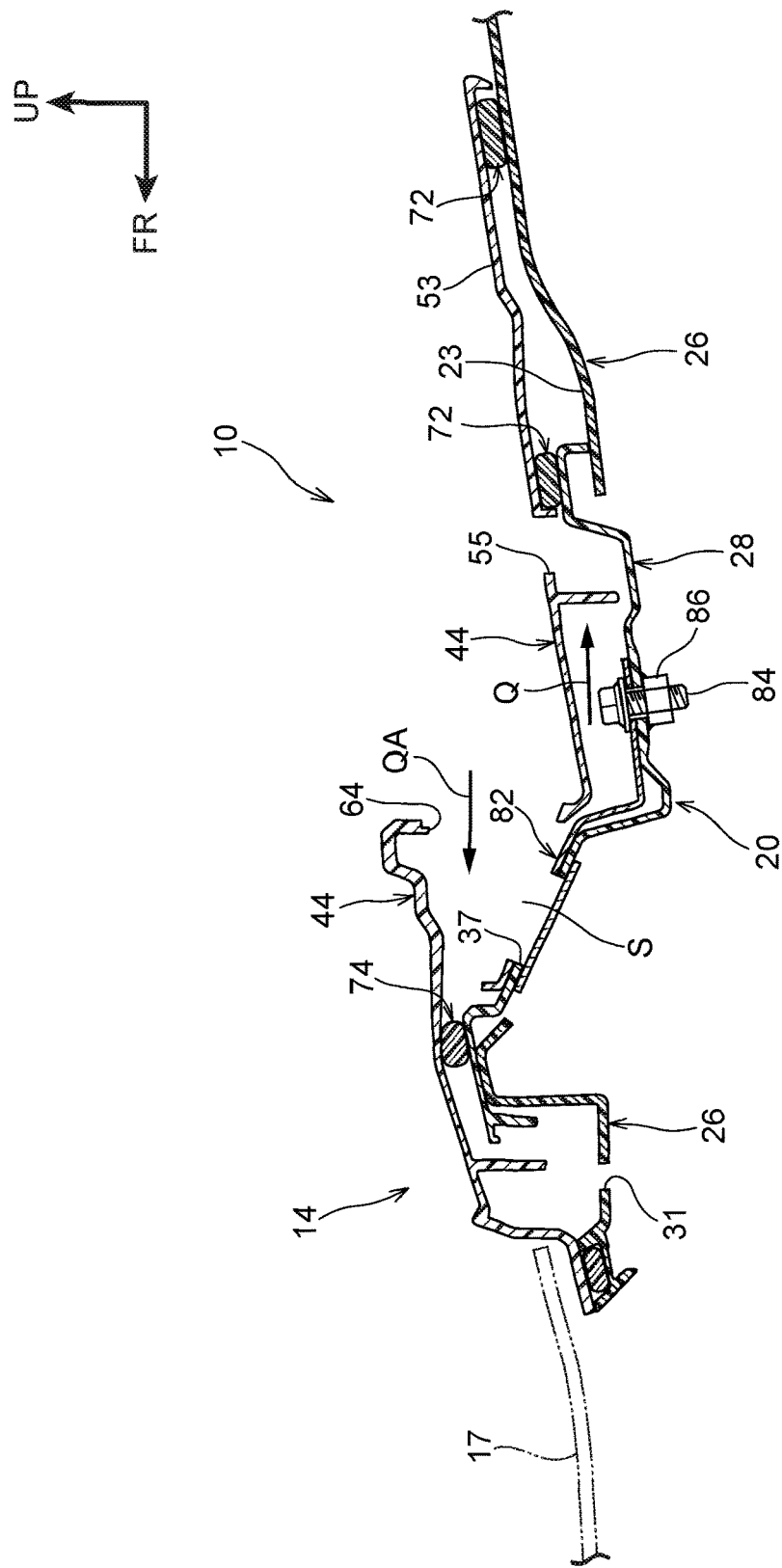
FIG. 9 is a vertical cross-section (a cross-section along line M-M in FIG. 4) of an open state of a back door according to the present exemplary embodiment.

As illustrated in FIG. 9, when the back door 14 has been swung about the door hinge 13 (see FIG. 2) and placed in the open state, slope angles of the extension 28 and the outer lower panel 44 change, and the vertical wall 53 is in a state disposed along the vehicle front-rear direction and vehicle width direction. Some of the water Q that has collected in the space S passes between the outer lower panel 44 and the extension 28 and flows toward the water drainage hole 55 when this occurs. However, the remaining water Q that has collected in the space S flows from the elongated portion 72A toward the elongated portion 74A. Some of the water Q flowing toward the elongated portion 74A flows along the vehicle width direction.

Figure 10:
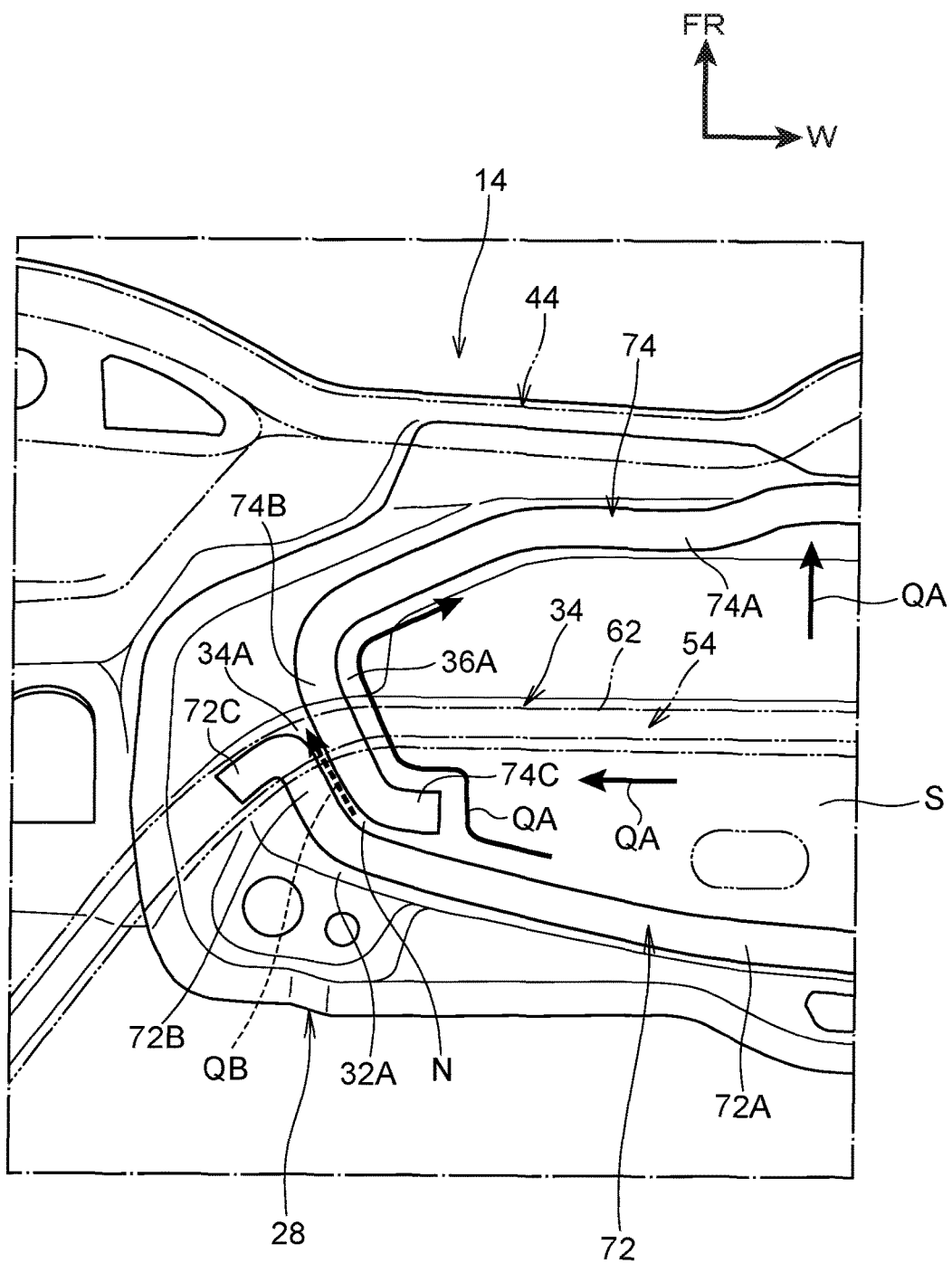
FIG. 10 is an explanatory diagram illustrating a flow of water that has collected between an extension and a door outer panel in an open state of a back door according to the present exemplary embodiment.

As illustrated in FIG. 10, the flow of the water QA that has flowed from the elongated portion 72A toward the elongated portion 74A in the space S is restricted by contact with the elongated portion 74A. The extension portions 74B that extend on the opposite side to the extension portions 72B are adjacent to the extension portions 72B in the vehicle width direction with the gaps N therebetween, and so water that has flowed along the vehicle width direction contacts at least one from out of the extension portions 74B or the extension portions 72B, such that the flow is restricted. The flow of the water QA from the space S through the gaps N and outward (to the vehicle interior) is restricted in this manner, thereby enabling the entry of the water QA into the vehicle interior when the back door 14 is placed in the open state to be suppressed. Note that, for example, a path along which the water QA that has flowed outward from the space S passes though the through-hole 31 (see FIG. 7) of the door inner panel 26 and enters the vehicle interior of the vehicle 10 (see FIG. 1) is an entry path of the water QA into the vehicle interior.

Moreover, the extension portions 74B are arranged further toward the vehicle width direction inner side than the extension portions 72B in the back door 14. Thus, when the back door 14 is placed in the open state, some of the water that has flowed along the extension portions 72B contacts the extension portions 74B. The water QA that has contacted the extension portions 74B is guided by the extension portions 74B and flows toward the elongated portion 74A. This enables the water QA to be suppressed from entering the gaps N between the extension portions 72B and the extension portions 74B. Note that when the back door 14 is being opened, the water QA flows toward the elongated portion 72A under the action of gravity.

Furthermore, the first step portion 34 and the second step portion 54 become vertical walls running along the vehicle vertical direction when the back door 14 is placed in the open state. Note that the extension portions 72B and the extension portions 74B are arranged on the end walls 34A that become the vertical walls. When water QB, this being some of the water QA, attempts to enter the gaps N, gravity acts on the water QB. Thus, the water QB is unable to run up the end walls 34A. This enables the water QB to be suppressed from flowing into the gaps N.

Furthermore, although the water QB attempts to enter the gaps N when the back door 14 is placed in the open state, the extension portions 72B and the extension portions 74B are arranged in diagonal directions intersecting the vehicle front-rear direction. Thus, a force component of the force acting in the entry direction acts on the water QB attempting to enter the gaps N. Specifically, the force acting on the water QA may be broken down into a first component force of a component along the extension direction of the extension portions 72B and the extension portions 74B, and a second component force of a component along a direction perpendicular to the extension direction of the extension portions 72B and the extension portions 74B. The second component force is cancelled out by reaction force from the extension portions 72B and the extension portions 74B, and so the force acting on the water QA is reduced to just the first component force. Namely, the force acting on the water QA at the extension portions 72B and the extension portions 74B is reduced, thereby enabling the water QA to be suppressed from flowing into the gaps N.

Note that the present disclosure is not limited to the above exemplary embodiment.

The back door 14 may be configured such that the inner panel 22 does not have a first step portion 34 and the outer panel 24 does not have a second step portion 54. The inner panel 22 is not limited to being made of resin, and may be made of metal.

The attached member is not limited to the license plate 58 and may be another member, as long as the attached member covers part of the outer panel 24 from the vehicle rear side. A cover member or the like attached to part of a peripheral edge of the lower glass 17 may be given as another example of an attached member.

As long as the first adhesive 72 obtains a greater adhesive strength than the second adhesive 74 and a lower elasticity than the second adhesive 74, the first adhesive 72 is not limited to being a urethane-based adhesive. Configuration may be such that the first adhesive 72 is only arranged within a region overlapping the license plate 58. In cases in which the attached member is another member that is not the license plate 58, it is sufficient that the first adhesive 72 is arranged in a region overlapping the other member. Note that the bent portions 72C do not need to be formed to the extension portions 72B.

As long as the second adhesive 74 has a higher elasticity than the first adhesive 72, the second adhesive 74 is not limited to being a butyl rubber-based adhesive. The second adhesive 74 may be arranged by being coated on. Configuration may be such that the second adhesive 74 is only arranged within a region overlapping locations of the outer panel 24 excluding a location where the license plate 58 is attached as viewed from the vehicle rear side. Furthermore, in cases in which the attached member is another member that is not the license plate 58, it is sufficient that the second adhesive 74 is arranged in a region overlapping locations of the outer panel 24 excluding a location where the other member is attached. The site where the second adhesive 74 is arranged may be further toward the vehicle vertical direction lower side than the license plate 58 (the first adhesive 72). Note that the bent portions 74C do not need to be formed to the extension portions 74B.

In cases in which the gaps N are small enough to suppress entry of the water Q, the extension portions 72B and the extension portions 74B may be arranged further toward the vehicle width direction outer sides than the first adhesive 72. The extension portions 72B and the extension portions 74B may be arranged outside the region C where the first step portion 34 and the second step portion 54 face each other. The extension portions 72B and the extension portions 74B may be extended along the vehicle vertical direction in the closed state of the door opening 12.

The liquid is not limited to water (rainwater) and may be a liquid such as detergent that has entered while washing the vehicle.

A back door according to an exemplary embodiment and respective modified examples of the present disclosure has been explained above. This exemplary embodiment and the respective modified examples may be combined and employed as appropriate, and obviously various modifications may be implemented within a range not departing from the spirit of the present disclosure.

What is claimed is:
1. A vehicle back door comprising:
an inner panel that is capable of swinging about a hinge provided to an upper edge portion of the inner panel;
an outer panel that is made of resin, that is disposed further toward a vehicle outer side than the inner panel and facing the inner panel in a vehicle front-rear direction, and that has an attached member attached to a vehicle outer portion of the outer panel;
a first adhesive that has at least a part arranged in a region overlapping the attached member as viewed from a vehicle rear side, and that joins the inner panel and the outer panel together; and
a second adhesive that has a higher elasticity than the first adhesive, that has at least a part arranged in a region overlapping locations of the outer panel excluding a location where the attached member is attached as viewed from the vehicle rear side, that forms a frame shape together with the first adhesive, and that joins the inner panel and the outer panel together,
one of the first adhesive or the second adhesive including a lower bottom portion that extends along a vehicle width direction, and lower extension portions that respectively extend from both vehicle width direction ends of the lower bottom portion toward a vehicle vertical direction upper side, and the other of the first adhesive or the second adhesive including an upper bottom portion that is arranged further toward the vehicle vertical direction upper side than the lower bottom portion and that extends along the vehicle width direction, and upper extension portions that respectively extend toward a vehicle vertical direction lower side from both vehicle width direction ends of the upper bottom portion and that are adjacent to the lower extension portions in the vehicle width direction across a gap between the lower extension portions and the upper extension portions.

2. The vehicle back door of claim 1, wherein the upper extension portions are arranged further toward a vehicle width direction inner side than the lower extension portions.

3. The vehicle back door of claim 1, wherein:
the inner panel is formed with a first step portion that has a vehicle vertical direction upper side positioned further toward the vehicle rear side than a vehicle vertical direction lower side of the first step portion in a closed state of a door opening provided to a vehicle rear end;
the outer panel is formed with a second step portion that has a vehicle vertical direction upper side positioned further toward the vehicle rear side than a vehicle vertical direction lower side of the second step portion in the closed state, and that is disposed facing the first step portion; and
the lower extension portions and the upper extension portions are arranged in a region where the first step portion and the second step portion face each other.

4. The vehicle back door of claim 1, wherein the lower extension portions and the upper extension portions each extend in a diagonal direction intersecting the vehicle vertical direction in a closed state of a door opening provided to a vehicle rear end.

5. The vehicle back door of claim 1, wherein:
the lower bottom portion is curved in a shape bulging toward the vehicle vertical direction lower side; and
the upper bottom portion is curved in a shape bulging toward the vehicle vertical direction upper side.

6. The vehicle back door of claim 1, wherein the attached member covers part of the outer panel from the vehicle rear side.

7. The vehicle back door of claim 6, wherein the attached member is a license plate.

* * * * *